(12) United States Patent
Lee et al.

(10) Patent No.: US 7,493,915 B2
(45) Date of Patent: Feb. 24, 2009

(54) DISCHARGE VALVE FOR COMPRESSOR

(75) Inventors: Jeong Ho Lee, Kyungki-do (KR); Ho Seon Rew, Seoul (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 10/902,090

(22) Filed: Jul. 30, 2004

(65) Prior Publication Data
US 2005/0056329 A1 Mar. 17, 2005

(30) Foreign Application Priority Data
Sep. 17, 2003 (KR) .................. 10-2003-0064475

(51) Int. Cl.
*F16K 15/16* (2006.01)
(52) U.S. Cl. ..................... 137/856; 137/857
(58) Field of Classification Search ............... 137/855, 137/856, 857; 417/569, 571
See application file for complete search history.

(56) References Cited

U.S. PATENT DOCUMENTS

| | | | | |
|---|---|---|---|---|
| 1,669,889 | A | * | 5/1928 | Andrews et al. ............ 137/856 |
| 2,000,883 | A | * | 5/1935 | Cullen et al. ................ 417/549 |
| 3,403,847 | A | | 10/1968 | Parker |
| 3,998,571 | A | * | 12/1976 | Falke .......................... 417/569 |
| 4,911,614 | A | * | 3/1990 | Kawai et al. ................. 417/269 |
| 5,016,669 | A | * | 5/1991 | Jamieson ..................... 137/512 |
| 5,140,748 | A | | 8/1992 | Kandpal |
| 5,327,932 | A | * | 7/1994 | Rozek .................... 137/512.15 |
| 2002/0085931 | A1 | * | 7/2002 | Lee et al. .................... 417/312 |
| 2002/0119059 | A1 | * | 8/2002 | Sato et al. ................... 417/571 |
| 2003/0095883 | A1 | * | 5/2003 | Hauser ....................... 417/569 |

FOREIGN PATENT DOCUMENTS

| | | |
|---|---|---|
| DE | 2215983 | 10/1973 |
| DE | 10126765 | 7/2002 |
| DE | 10157234 | 7/2003 |
| JP | 54100202 | 7/1979 |
| JP | 56-173262 | 12/1981 |
| JP | 57181981 | 11/1982 |
| JP | 6215661 | 1/1987 |
| JP | 63108573 | 7/1988 |

OTHER PUBLICATIONS

English language abstract of JP-56-173262.
English language Abstract of JP 57-181981.

* cited by examiner

*Primary Examiner*—Kevin L Lee
(74) *Attorney, Agent, or Firm*—Greenblum & Bernstein, P.L.C.

(57) ABSTRACT

Disclosed herein is a discharge valve for a compressor. The discharge valve comprises a valve plate for opening or closing a discharge port, a valve spring positioned downstream from the valve plate and adapted to provide elasticity to the valve plate, and a retainer positioned downstream from the valve spring and adapted to limit a maximum displacement of both the valve plate and the valve spring. The valve spring has a fluid-passage hole for the passage of fluid discharged from the discharge port. With such a configuration, the discharge valve can not only reduce flow loss and overshooting loss of the fluid, but also minimize backflow of the discharged fluid, resulting in an improvement in performance of the compressor.

16 Claims, 4 Drawing Sheets

DISCHARGE VALVE FOR COMPRESSOR

BACKGROUND OF THE INVENTION

1. Field of the Invention

The present invention relates to a discharge valve for use in a reciprocating compressor, and more particularly to a discharge valve for a compressor comprising a valve spring and a valve retainer for supporting a valve plate adapted to open or close a discharge port.

2. Description of the Related Art

In general, a discharge valve for a compressor, as shown in FIG. 1, is installed at an outlet of a cylinder block 5, and is adapted to control the outflow of fluid compressed in a compression chamber 6.

Such a discharge valve comprises a valve seat 1 coupled to the cylinder block 5, and a valve plate 2, a valve spring 3, and a retainer 4, which are successively assembled to the valve seat 1.

The valve seat 1 is formed with a discharge port 1a, through which the fluid compressed in the compression chamber 6 is discharged, and is further formed with a recessed portion 1b for use in the mounting of the valve plate 2, the valve spring 3, and the retainer 4.

The valve plate 2 is designed to open or close the discharge port 1a, and the valve spring 3 serves to reinforce the stiffness of the valve plate 2 in order to increase a damping force and restoring force thereof. In addition, the retainer 4 serves to limit a maximum displacement of both the valve plate 2 and the valve spring 3, thereby preventing any possible damage to the discharge valve.

Now, the opening and closing operations of the discharge valve for a compressor configured as stated above will be explained.

If a piston (not shown), adapted to reciprocate in the compression chamber 6 of the cylinder block 5, is advanced to compress the fluid in the compression chamber 6, and thereby a pressure level of the compressed fluid overcomes a support force of the valve plate 2 and the valve spring 3, the compressed fluid pushes the valve plate 2 to open the discharge port 1a, and is discharged out of the compression chamber 6 through the open discharge port 1a.

On the contrary, if the piston (not shown) is retracted, and thereby the interior pressure of the compression chamber 6 is lowered, the valve plate 2 is restored to close the discharge port 1a by virtue of an elastic restoring force of the valve spring 3 and a suction force of the compression chamber 6.

However, the above described conventional discharge valve for use in a reciprocating compressor has a problem in that, due to the fact that the valve spring 3 and the retainer 4, which are successively mounted downstream from the valve plate 2 as shown in FIG. 2, take the form of a flat bar, they may obstruct the outflow of the compressed fluid through the discharge port 1a, thereby possibly causing flow loss.

In addition, since the valve spring 3 is generally made of spring steels, etc., it has a limitation of reducing stiffness without a reduction in size and thus has a difficulty of improving flexural elasticity thereof.

SUMMARY OF THE INVENTION

Therefore, the present invention has been made in view of the above problems, and it is an object of the present invention to provide a discharge valve for a compressor, which is designed to reduce flow resistance of fluid by securing smooth outflow of the fluid through a discharge port, thereby being capable of reducing flow loss as well as overshooting loss of the discharge valve.

It is another object of the present invention to provide a compressor, which is designed to reduce flow loss and overshooting loss possibly causing in a discharge valve thereof, resulting in an improvement in performance thereof.

In accordance with one aspect of the present invention, the above and other objects can be accomplished by the provision of a discharge valve for a compressor comprising: a valve plate for opening or closing a discharge port; and a valve spring positioned downstream from the valve plate and adapted to provide elasticity to the valve plate, the valve spring having a fluid-passage hole for the passage of fluid discharged from the discharge port.

Preferably, the fluid-passage hole of the valve spring may be an elongated hole extending from a portion coming into contact with an end of the valve plate to a portion close to an end of the valve spring.

Preferably, the valve spring may further have an elasticity-providing hole for improving flexural elasticity thereof.

Preferably, the elasticity-providing hole may be positioned downstream from the valve plate.

Preferably, the elasticity-providing hole may be configured to communicate with the fluid-passage hole of the valve spring.

Preferably, the discharge valve may further comprise a retainer positioned downstream from the valve spring and adapted to limit a maximum displacement of both the valve plate and the valve spring.

Preferably, the retainer may have a fluid-passage hole.

Preferably, the fluid-passage hole of the retainer may be positioned immediately downstream from the fluid-passage hole of the valve spring.

Preferably, the fluid-passage hole of the retainer may be larger than the fluid-passage hole of the valve spring.

In accordance with another aspect of the present invention, the above and other objects can be accomplished by the provision of a discharge valve for a compressor comprising: a valve plate for opening or closing a discharge port; and a retainer positioned downstream from the valve plate and adapted to limit a maximum displacement of the valve plate, the retainer having a fluid-passage hole for the passage of fluid discharged from the discharge port.

In accordance with yet another aspect of the present invention, the above and other objects can be accomplished by the provision of a compressor comprising: a cylinder block internally defining a compression chamber, in which fluid is compressed; a valve seat installed on the cylinder block and having a discharge port, through which the fluid compressed in the compression chamber is discharged; a valve plate mounted in the valve seat and adapted to open or close the discharge port; a valve spring positioned downstream from the valve plate and adapted to provide elasticity to the valve plate; and a retainer positioned downstream from the valve spring and adapted to limit a maximum displacement of both the valve plate and the valve spring, wherein at least one of the valve spring and the retainer is formed with a fluid-passage hole for the passage of the fluid discharged from the discharge port.

Preferably, both the valve spring and the retainer may have the fluid-passage holes, respectively.

With the discharge valve for a compressor and the compressor as stated above, by virtue of the fact that the fluid-passage holes are formed at both the valve spring and the retainer for securing smooth outflow of the fluid discharged from the discharge port, there is an advantage for reducing flow loss of the fluid. Further, since the valve spring has a reduced area so as to be less influenced by flow resistance during the closure thereof, thereby securing the successful closing operation of the valve plate, it is possible to minimize backflow of the discharged fluid, and to minimize the stiffness of the valve spring, resulting in a reduction in overshooting loss of the fluid, as well as an improvement in performance of the compressor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in greater detail with reference to the accompanying drawings. In the following description, a detailed description of known functions and configurations incorporated herein will be omitted when it may make the subject matter of the present invention rather clear.

Figure 1:
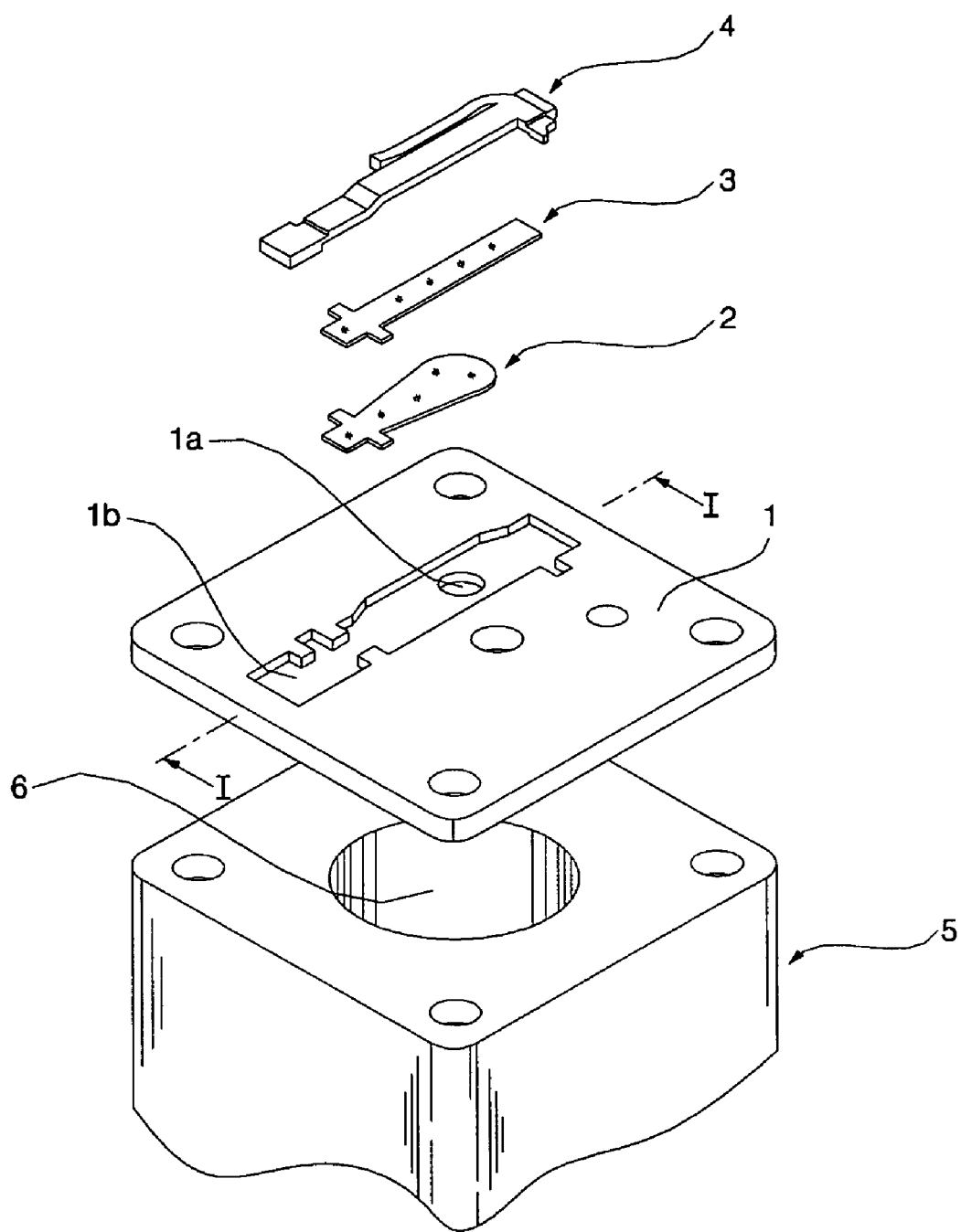
FIG. 1 is an exploded perspective view illustrating a discharge valve for a conventional compressor.
Figure 2:
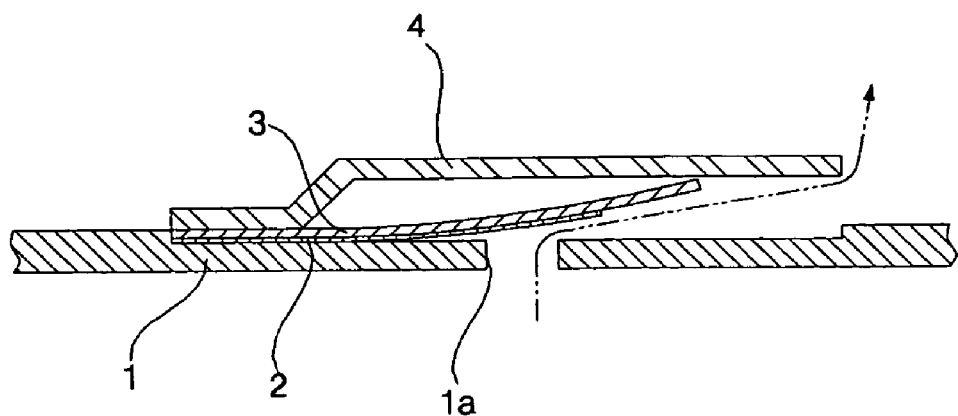
FIG. 2 is a sectional view taken along the line I-I shown in FIG. 1.
Figure 3:
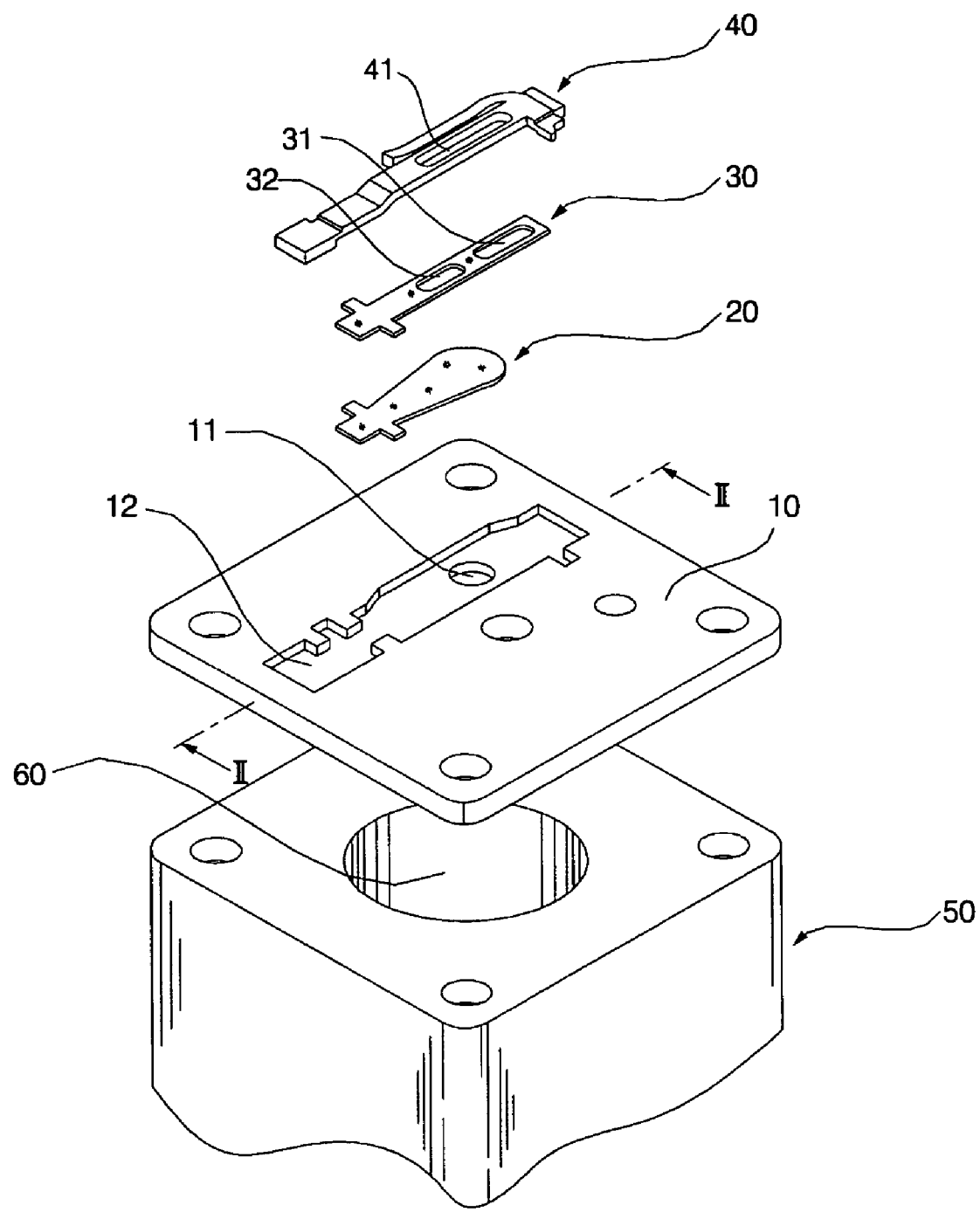
FIG. 3 is an exploded perspective view illustrating a discharge valve for a compressor in accordance with an embodiment of the present invention.
Figure 4:
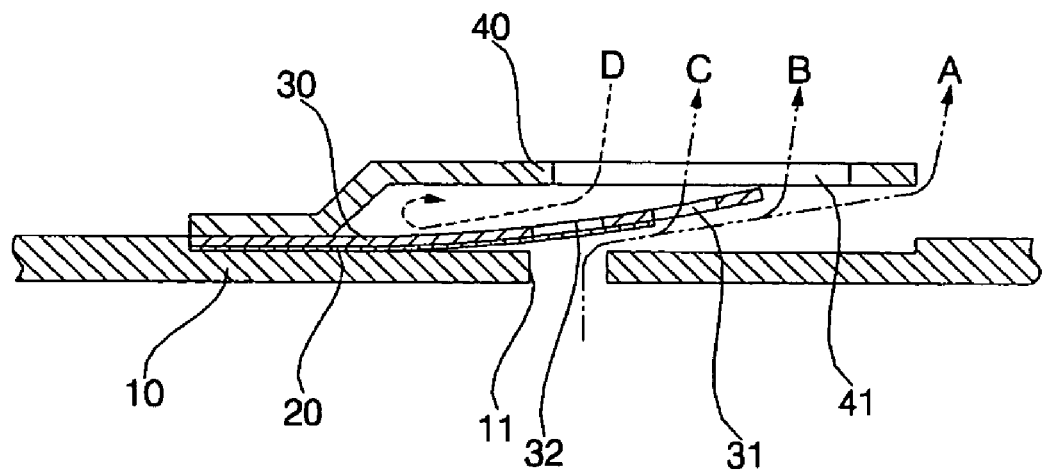
FIG. 4 is a sectional view taken along the line II-II shown in FIG. 3.

FIG. 3 is an exploded perspective view illustrating a discharge valve for a compressor in accordance with an embodiment of the present invention. FIG. 4 is a sectional view taken along the line II-II shown in FIG. 3.

As shown in FIGS. 3 and 4, the discharge valve for a compressor according to the present invention comprises a valve seat 10 designed to be fixed on a cylinder block 50 defining a compression chamber 60 therein, and a valve plate 20, valve spring 30 and retainer 40, which are successively mounted on the valve seat 10.

The valve seat 10 is formed with a discharge port 11, through which fluid compressed in the compression chamber 60 is discharged, and is further formed with a recessed portion 12 for the successive mounting of the valve plate 20, the valve spring 30, and the retainer 40 therein.

The valve plate 20 takes the form of an elongated plate, and is seated in the recessed portion 12 of the valve seat 10 for selectively opening and closing the discharge port 11.

The valve spring 30 and the retainer 40 are successively disposed downstream from the valve plate 20, and are formed with holes 31 and 41, respectively. In an opened state of the discharge port 11, the holes 31 and 41 are used for the passage of the compressed fluid discharged from the open discharge port 11.

Here, in order to facilitate the direct passage of the fluid discharged from the discharge port 11, the hole 31 of the valve spring 30 is preferably configured so that it extends from one position, where an end of the valve plate 20, pushed toward the valve spring 30 to open the discharge port 11, is in contact, to the other position close to an end of the valve spring 30.

Similarly, in order to facilitate the direct passage of the fluid passed through the hole 31 of the valve spring 30, preferably, the hole 41 of the retainer 40 is positioned immediately downstream from the hole 31, and is configured so that it extends to a position extremely close to an end of the retainer 40.

Preferably, the hole 41 formed at the retainer 40 is larger than the hole 31 formed at the valve spring 30 for securing the smooth outflow of the fluid discharged from the discharge port 11.

Meanwhile, the valve spring 30 is additionally formed with an auxiliary hole 32. The auxiliary hole 32 serves to improve overall flexural elasticity of a portion of the valve spring 30 coming into contact with the valve plate 20. By adjusting the size of the auxiliary hole 32, it is possible to appropriately adjust an available elastic area of the valve spring 30, which is conventionally made of spring steels.

Preferably, the auxiliary hole 32 of the valve spring 30 is positioned immediately downstream from the valve plate 20.

Now, the operation and effects of the discharge valve for a compressor in accordance with the embodiment of the present invention will be explained.

If the interior pressure of the compression chamber 60 defined in the cylinder block 50 exceeds a predetermined value, the compressed fluid pushes the valve plate 20 to open the discharge port 11. Thereby, the compressed fluid is discharged out of the compression chamber 60 through the open discharge port 11.

Here, considering an outflow path of the compressed fluid with reference to FIG. 4, it comprises a conventional outflow path (A) extending round the respective ends of one side of the valve plate 20, valve spring 30, and retainer 40, an outflow path (C) extending round the end of the valve plate 20 and successively passing through the holes 31 and 41 formed at the valve spring 30 and retainer 40, and an outflow path (B) extending round the respective ends of the one side of the valve plate 20 and valve spring 30, and passing through the hole 41 of the retainer 40. As these several outflow paths are provided downstream from the discharge port 11, the discharge of the compressed fluid is more smoothly achieved, resulting in a reduction in flow resistance of the fluid.

The valve spring 30, which serves to endow the valve plate 20 with an additional elasticity when the valve plate 20 closes the discharge port 11, has a reduced fluid reaction area by virtue of the hole 31 thereof. This has an effect of facilitating restoration of the end of the valve spring 30.

Furthermore, in a state wherein the end of the valve spring 30 is pushed to be apart from the discharge port 11, the discharged fluid is guided to flow into a space defined between the valve spring 30 and the retainer 40 through the hole 41 of the retainer 40 along an inflow path (D) as shown in FIG. 4. Such a smooth inflow of the fluid results in a reduction in a pneumatic pressure of the fluid, thereby causing the restoration of the valve spring 30 to be more easily and smoothly achieved.

Figure 5:
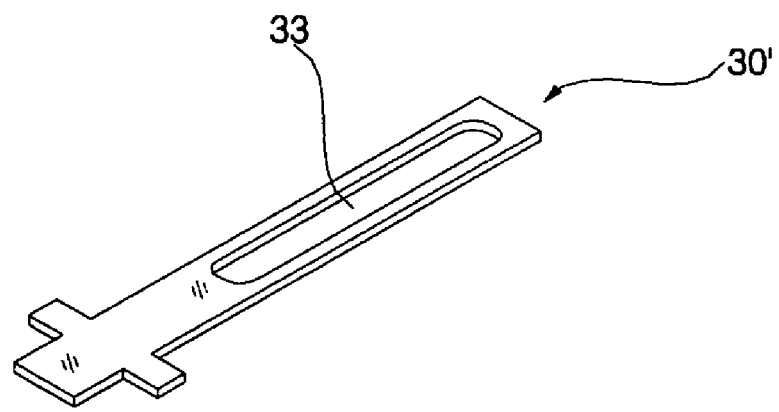
FIG. 5 is a perspective view illustrating a valve spring for use in a discharge valve of a compressor in accordance with another embodiment of the present invention.

FIG. 5 is a perspective view illustrating a valve spring 30' for use in a discharge valve for a compressor in accordance with another embodiment of the present invention.

Although the valve spring 30 of the previous embodiment is formed with two holes 31 and 32, according to the present embodiment, the valve spring 30' is formed with a single large hole 33 having a size equal to that of both the holes 31 and 32 communicating with each other.

As apparent from the above description, the present invention provides a discharge valve for a compressor, which can secure smooth outflow of fluid by virtue of fluid-passage holes formed at a valve spring and a retainer, respectively, thereby being capable of reducing flow loss of the fluid.

Further, according to the present invention, since the valve spring has a reduced area so as to be less influenced by flow resistance during the closure thereof, thereby securing the successful closing operation of a valve plate, it is possible to minimize backflow of the discharged fluid, and to minimize the stiffness of the valve spring, resulting in a reduction in overshooting loss of the fluid, and an improvement in performance of the compressor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A discharge valve for a compressor comprising:
   a valve seat having a discharge port;
   a valve plate having a fixed portion at one end thereof fixed to the valve seat and a cover portion at an opposite end thereof to open or close the discharge port, said valve plate made of a flat sheet of material devoid of any opening that passes fluid; and
   a valve spring positioned downstream from the valve plate to provide elasticity to the valve plate, the valve spring having a fixed portion which is fixed to the fixed portion of the valve plate and an elongated portion extending from a portion in contact with the cover portion of the valve plate in an opposite direction from the fixed portion of the valve plate, said elongated portion extending outwardly from the opposite end of the valve plate, said elongated portion being a free end;
   wherein the valve spring has a fluid-passage hole at the elongated portion to pass fluid discharged from the discharge port.

2. The valve as set forth in claim 1, wherein the fluid-passage hole of the valve spring is an elongated hole extending from a portion coming into contact with an end of the valve plate to a portion close to an end of the valve spring.

3. The valve as set forth in claim 1, wherein the valve spring further has an elasticity-providing hole that improves flexural elasticity thereof.

4. The valve as set forth in claim 3, wherein the elasticity-providing hole is positioned downstream from the valve plate.

5. The valve as set forth in claim 3, wherein the elasticity-providing hole is configured to communicate with the fluid-passage hole of the valve spring.

6. The valve as set forth in claim 1, further comprising:
   a retainer positioned downstream from the valve spring to limit a maximum displacement of both the valve plate and the valve spring.

7. The valve as set forth in claim 6, wherein the retainer has a fluid-passage hole.

8. The valve as set forth in claim 7, wherein the fluid-passage hole of the retainer is positioned immediately downstream from the fluid-passage hole of the valve spring.

9. The valve as set forth in claim 7, wherein the fluid-passage hole of the retainer is larger than the fluid-passage hole of the valve spring.

10. A discharge valve for a compressor, said discharge valve comprising:
    a valve seat having a discharge port;
    a valve plate having a fixed portion at one end thereof and a cover portion at another end thereof to open and close a discharge port; and
    a retainer positioned to be spaced apart downstream from the cover portion of the valve plate to limit a maximum displacement of the valve plate; and
    a valve spring provided between the valve plate and the retainer, and adapted to provide elasticity to the valve plate;
    wherein the retainer has a fluid-passage hole through which fluid is discharged to an outer side of the retainer when fluid is discharged from the discharge port,
    wherein the valve spring has an elasticity-providing hole that improves flexural elasticity thereof, wherein the valve spring has a fluid-passage hole to pass the fluid discharged from the discharge port.

11. The valve as set forth in claim 10, wherein the fluid-passage hole of the valve spring is an elongated hole extending from a portion coming into contact with an end of the valve plate to a portion close to an end of the valve spring.

12. The valve as set forth in claim 10, wherein the elasticity-providing hole is positioned downstream from the valve plate.

13. The valve as set forth in claim 10, wherein the elasticity-providing hole is configured to communicate with the fluid-passage hole of the valve spring.

14. The valve as set forth in claim 10, wherein the fluid-passage hole of the retainer is positioned immediately downstream from the fluid-passage hole of the valve spring.

15. The valve as set forth in claim 10, wherein the fluid-passage hole of the retainer is larger than the fluid-passage hole of the valve spring.

16. A compressor comprising:
    a cylinder block internally defining a compression chamber, in which fluid is compressed;
    a valve seat installed on the cylinder block, the valve seat having a discharge port, through which the fluid compressed in the compression chamber is discharged;
    a valve plate having a fixed portion at one end thereof and a cover portion at an opposite end thereof to open or close the discharge port, said valve plate made of a flat sheet of material devoid of any opening that passes fluid;
    a valve spring positioned downstream from the valve plate to be in contact with the valve plate to provide elasticity to the valve plate, said valve spring having a fixed portion which is fixed to the fixed portion of the valve plate and an elongated portion extending from an end portion being contacted by the cover portion of the valve plate, the end portion being a portion opposite to the fixed portion of the valve plate, said elongated portion being a free end; and
    a retainer positioned downstream from the valve spring to limit a maximum displacement of both the valve plate and the valve spring,
    wherein at least one of the valve spring and the retainer is formed with a fluid-passage hole to pass the fluid discharged from the discharge port,
    wherein both the valve spring and the retainer have the fluid-passage holes, respectively.

* * * * *